July 2, 1963  K. SCHLOTMANN  3,095,714
FLEXIBLE COUPLINGS
Filed May 24, 1961

INVENTOR
Karl Schlotmann

United States Patent Office 3,095,714
Patented July 2, 1963

3,095,714
FLEXIBLE COUPLINGS
Karl Schlotmann, Unna, Westphalia, Germany, assignor to Maschinenfabrik Stromag G.m.b.H., Unna, Westphalia, Germany, a firm of Germany
Filed May 24, 1961, Ser. No. 127,414
3 Claims. (Cl. 64—11)

This invention relates to flexible couplings for coupling coaxial shafts.

It is a general object of this invention to provide improved couplings of the aforementioned character.

This invention relates more particularly to flexible couplings including a torque-transmitting member made largely, or substantially, of an elastomer, e.g. vulcanized rubber, and being substantially in the shape of a tire of an automotive vehicle. Flexible couplings of this character are described and claimed in United States Patent 2,648,958 to Karl Schlotmann, August 18, 1953, Flexible Coupling.

It is another object of this invention to provide flexible couplings having the advantages of the flexible couplings disclosed in the aforementioned patent but not being subject to the limitations of these prior art couplings.

One of the limitations of the aforementioned prior art couplings resides in the fact that it is relatively difficult to replace the elastic tire-shaped torque-transmitting member when the same is damaged, or worn out. Such a replacement requires an increase of the axial spacing of the two coaxial shafts which are intended to be coupled together to allow the torque-transmitting member to be inserted into the gap formed between the two shafts. Upon having placed the flexible torque-transmitting member into position the two shafts to be coupled must be restored to their initial positions and be re-aligned. These operations involve a considerable amount of work and require a considerable amount of skill.

It is, therefore, another object of this invention to provide flexible couplings having the same desirable operating characteristics as the flexible couplings according to the aforementioned United States Patent 2,648,958, but which include torque-transmitting members lending themselves more readily to installation than those of United States Patent 2,648,958.

The couplings disclosed and claimed in United States Patent 2,648,958 include flanges and clamping rings which increase their weight, the cost of the material that goes into the couplings, and the cost of machining the same.

It is, therefore, a further object of this invention to provide flexible couplings having substantially the same operating characteristics as those disclosed and claimed in United States Patent 2,648,958, but not being subject to the aforementioned limitations.

Figure 1:
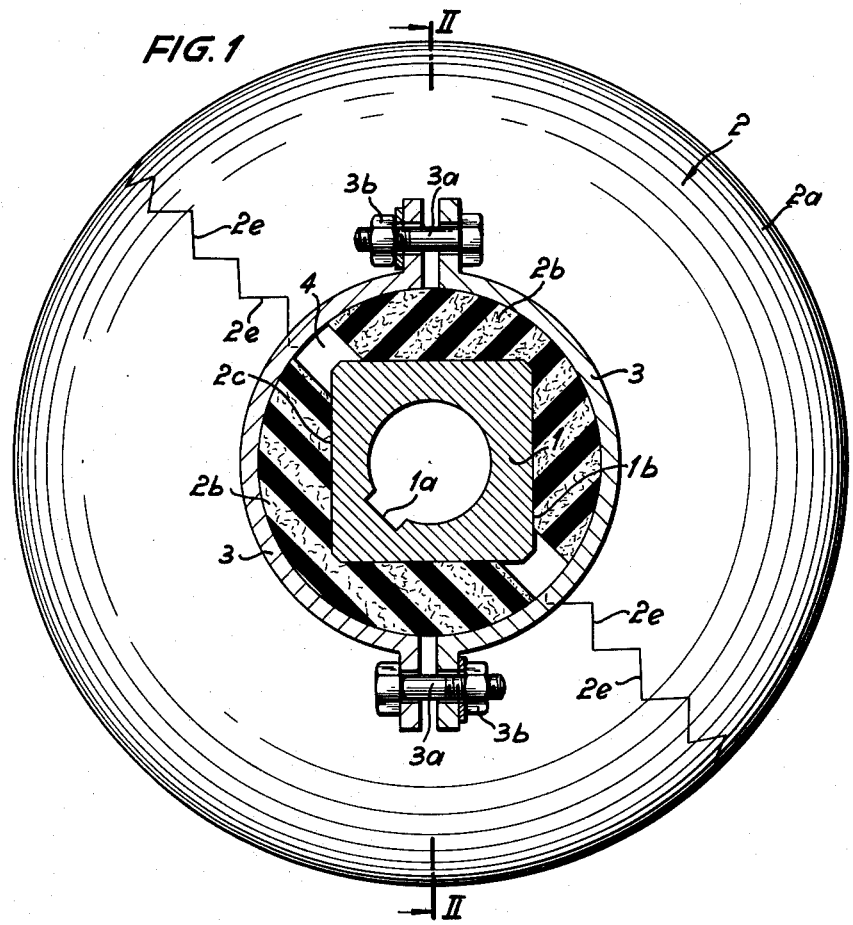
Figure 2:
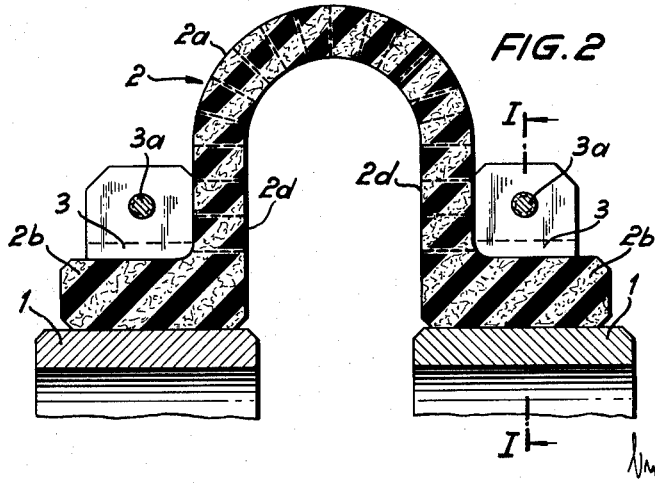

The foregoing and other general and special objects of this invention and advantages thereof will more clearly appear from the ensuing description of a preferred embodiment thereof illustrated in the accompanying drawings wherein:

FIG. 1 is a section taken along 1—1 of FIG. 2; and
FIG. 2 is a section along 2—2 of FIG. 1.

Referring now to the drawings, numerals 1 have been applied to indicate a pair of hub-members preferably of metal each adapted to be mounted upon, and keyed to, one of a pair of coaxial shafts (not shown). Reference character 1a has been applied to indicate a groove inside of one of the hub-members 1 for receiving a key to key the particular hub-member 1 to a shaft on which the former is mounted. Both hub-members 1 are provided with such grooves. Reference numeral 2 has been applied to generally indicate a torque-transmitting member for transmitting torque from one of hub-members 1 to the other of hub-members 1, and consequently also from one of the shafts upon which one of the hub-members 1 is mounted and to which one of the hub-members 1 is keyed to the shaft upon which the other of the hub-members 1 is mounted and to which the other of the hub-members 1 is keyed. Torque-transmitting member 2 is shaped in the fashion of a tire of an automotive vehicle and consists largely, or substantially, of an elastomer, e.g. vulcanized rubber, and may have inserts of canvas, or other re-inforcing inserts. Torque-transmitting member 2 includes a central substantially annular portion 2a substantially U-shaped in cross-section. Portion 2a has a pair of flanges or flange portions 2d at right angles to the longitudinal axis of hub-members 1. Torque-transmitting member 2 further includes a pair of integral hub-extensions 2b projecting in opposite directions from the central annular portion 2a thereof. Hub-extensions 2b are substantially in the form of rubber sleeves, or sleeves made of a comparable elastomer, and each of them is mounted on one of the hub-members 1. The radially outer surfaces 1b of hub-members 1 are in the shape of multilateral prisms substantially square in cross-section, and the radially inner surfaces 2c of hub-extensions 2b are in the shape of multilateral prisms substantially congruent with surfaces 1b, and have cross-sections which are congruent with the cross-sections of surfaces 1b, thus precluding relative rotational movement of hub-extensions 2b and hub-members 1 when the former are firmly mounted on the latter, as will be shown below more in detail. As mentioned above, the radial cross-section of the central portion 2a of torque-transmitting member 2 is substantially in the shape of a U and the integral hub-extensions 2b of member 2 projecting at right angles from the ends of the flange portions 2d thereof are toroids formed by rotation of generatrices about the longitudinal axis of hub-members 1. Torque-transmitting member 2 is diametrically subdivided into a pair of separate torque-transmitting units having abutting surfaces 2e, 2e extending substantially diametrically. Surfaces 2e, 2e are in the form of systems of teeth in cooperative relation each including male and female portions. By virtue of this engagement surfaces 2e, 2e preclude relative axial displacement of the two torque-transmitting units into which torque-transmitting member 2 is subdivided by surfaces 2e, 2e. The coupling structure further comprises a pair of annular clamping members 3 each mounted on one of hub-extensions 2b and each clamping one of the hub-extensions 2b against one of hub-members 1. In the embodiment of the invention shown in FIGS. 1 and 2 each of the clamping members 3 is made up of a pair of semi-circular parts which are joined together by a pair of screw-threaded studs 3a each supporting a tightening nut 3b. It will be apparent from FIG. 1 that the meshing gear surfaces 2e, 2e extend all across the central annular portion 2a of torque-transmitting member 2. While the two separate torque-transmitting units into which torque-transmitting member 2 is subdivided are in abutting relation along surfaces 2e, 2e these units are separated by gaps 4 in the region of the hub-extensions 2b thereof. Gaps 4 decrease in size as the clamping members 3 are being tightened progressively and exert increasing radial clamping pressures upon hub-extensions 2b. The presence of gaps 4 is a means which allows the required elastic displacement of the rubber, or other elastomer of which hub-extensions 2b are made, when the clamping pressure upon hub-extensions 2b is progressively increased.

If the torque to be transmitted from a driving shaft to a coaxial driven shaft is relatively small, the hub-members 1 may be dispensed with. In this case the hub-extensions 2b are being mounted directly on the shafts to be coupled, and must be provided with appropriate means for precluding rotational movements relative to the shafts upon which they are mounted.

In the embodiment of the invention shown the torque-transmitting member 2 is diametrically subdivided into two separate torque-transmitting units. If desired, the torque-transmitting member 2 may be radially subdivided in a similar fashion into a larger number of separate torque-transmitting units. Such a subdivision may be in order in the case of flexible couplings having relatively large sizes.

Relatively small flexible couplings do not require dual clamps as shown in FIGS. 1 and 2. Such couplings may be provided with lighter clamping means, e.g. ribbon-type clamps similar to the worm gear hose clamps used for attaching radiator hose in the automotive industries.

It will be apparent that the torque-transmitting units into which torque-transmitting member 2 is subdivided can be placed on, and removed from, a pair of coaxial shafts without disturbing the same. All that is needed for so doing is bending the slotted portions of hub-extensions 2b.

Having disclosed a preferred embodiment of my invention, it is desired that the same be not limited to any particular structure disclosed. It will be obvious to any person skilled in the art that many modifications and changes may be made without departing from the broad spirit and scope of my invention. Therefore it is desired that the invention be interpreted as broadly as possible and that it be limited only by the prior state of the art.

I claim as my invention:

1. A flexible coupling for coupling coaxial shafts comprising a torque-transmitting member of an elastomer including a central substantially annular portion substantially U-shaped in cross-section and a pair of integral hub-extensions projecting in opposite axial directions at right angles from the flange portions of said central portion, said torque-transmitting member being subdivided substantially radially into a plurality of separate complementary torque-transmitting units, means for precluding relative rotational movement between said pair of hub-extensions and a pair of coaxial shafts, said precluding means including a pair of substantially annular clamping members each mounted on one of said pair of hub-extensions and each adapted to exert radial clamping pressure upon one of said pair of hub-extensions, said means for precluding relative movement further including a pair of coaxial metallic hub-members adapted to be mounted directly upon and keyed to a pair of coaxial shafts and to form a pair of mounting supports for said pair of hub-extensions, each of said pair of hub-extensions having a radially inner surface in the shape of a multilateral prism abutting against the radially outer surface of one of said pair of hub-members in the shape of a congruent multilateral prism, gaps being defined between said plurality of torque-transmitting units in the regions of said pair of hub-extensions thereof allowing compression of portions of said pair of hub-extensions into said gaps.

2. A flexible coupling for coupling a pair of coaxial shafts comprising a torque-transmitting member of an elastomer including a central substantially annular portion substantially U-shaped in cross-section and a pair of integral hub-extensions projecting in opposite axial directions at right angles from the flange portions of said central portion, said torque-transmitting member being subdivided substantially radially into a plurality of separable torque-transmitting units; means for precluding relative rotational movement between said pair of hub-extensions and a pair of coaxial shafts, said precluding means including a pair of substantially annular clamping members each mounted on one of said pair of hub-extensions and each adapted to exert radial clamping pressure upon one of said pair of hub-extensions, said means for precluding relative movement further including a radially inner surface in the shape of a multilateral prism on each of said pair of hub-extensions and a pair of congruent radially outer surfaces each adapted to form an integral part of one of said pair of shafts and to be abuttingly engaged by said radially inner surface of one of said pair of hub-extensions, gaps being defined between said plurality of torque-transmitting units in the regions of said pair of hub-extensions allowing compression of portions of said pair of hub-extensions into said gaps.

3. A flexible coupling for coupling a pair of coaxial shafts comprising means defining a first pair of surfaces coaxial with the pair of shafts to be coupled, each adapted to form an integral part of one of said pair of shafts and each having in cross-section the shape of a polygon; a torque-transmitting member of an elastomer including a central substantially annular portion substantially U-shaped in cross-section and a pair of integral hub-extensions projecting in opposite directions at right angles from the flange portions of said central portion, said torque-transmitting member being subdivided substantially radially into a plurality of torque-transmitting units, said pair of hub-extensions defining internally a second pair of surfaces coaxial with the pair of shafts to be coupled, each having in cross-section the shape of a polygon and each mounted on one of said first pair of surfaces, a pair of radially extending gaps being defined between each of said pair of hub-extensions allowing compresison of portions of each of said pair of hub-extensions into one of said pair of gaps.

References Cited in the file of this patent
UNITED STATES PATENTS

| | | |
|---|---|---|
| 809,903 | Bowers | Jan. 9, 1906 |
| 2,648,958 | Schlotmann | Aug. 18, 1953 |
| 2,867,102 | Williams | Jan. 6, 1959 |

FOREIGN PATENTS

| | | |
|---|---|---|
| 852,098 | France | Oct. 16, 1939 |